(12) United States Patent
Noh et al.

(10) Patent No.: US 8,351,347 B2
(45) Date of Patent: Jan. 8, 2013

(54) METHOD AND APPARATUS FOR TRANSMITTING SOUNDING REFERENCE SIGNAL IN RADIO COMMUNICATION SYSTEM

(75) Inventors: Min Seok Noh, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/320,514

(22) PCT Filed: May 17, 2010

(86) PCT No.: PCT/KR2010/003104
§ 371 (c)(1),
(2), (4) Date: Nov. 14, 2011

(87) PCT Pub. No.: WO2010/131934
PCT Pub. Date: Nov. 18, 2010

(65) Prior Publication Data
US 2012/0076037 A1 Mar. 29, 2012

Related U.S. Application Data

(60) Provisional application No. 61/178,818, filed on May 15, 2009, provisional application No. 61/305,080, filed on Feb. 16, 2010.

(30) Foreign Application Priority Data

May 14, 2010 (KR) .................. 10-2010-0045447

(51) Int. Cl.
*H04L 12/26* (2006.01)
*H04Q 7/00* (2006.01)
(52) U.S. Cl. ..................... 370/252; 370/328
(58) Field of Classification Search ............ 370/252, 370/254, 278, 282, 328, 338, 469
See application file for complete search history.

(56) References Cited

U.S. PATENT DOCUMENTS

| | | | |
|---|---|---|---|
| 2009/0046800 A1* | 2/2009 | Xu et al. | 375/267 |
| 2009/0147875 A1* | 6/2009 | Akita et al. | 375/260 |
| 2009/0168714 A1* | 7/2009 | Tanaka et al. | 370/329 |
| 2009/0303955 A1* | 12/2009 | Teo et al. | 370/329 |
| 2009/0323664 A1 | 12/2009 | Li et al. | |
| 2010/0074205 A1* | 3/2010 | Papasakellariou et al. | 370/329 |
| 2010/0111008 A1 | 5/2010 | Ishii | |
| 2011/0211489 A1* | 9/2011 | Chung et al. | 370/252 |

FOREIGN PATENT DOCUMENTS

| | | |
|---|---|---|
| KR | 10-2008-0073028 A | 8/2008 |
| KR | 10-2009-0028279 A | 3/2009 |
| WO | WO 2008/108228 A1 | 9/2008 |

* cited by examiner

*Primary Examiner* — Hong Cho
(74) *Attorney, Agent, or Firm* — Birch, Stewart, Kolasch & Birch, LLP

(57) ABSTRACT

Disclosed is a method for transmitting a sounding reference signal from to a base station in a radio communication system. More specifically, the method comprises the steps of: transmitting a periodic sounding reference signal to a base station; receiving a transmission instruction for an additional sounding reference signal from the base station; multiplexing said periodic sounding reference signal and said additional sounding reference signal along a frequency axis or a time axis; and transmitting said multiplexed periodic sounding reference signal and said additional sounding reference signal to said base station. Said multiplexing step is characterized by multiplexing said periodic sounding reference signal and said additional sounding reference signal along a frequency axis or a time axis.

10 Claims, 8 Drawing Sheets

FIG. 2
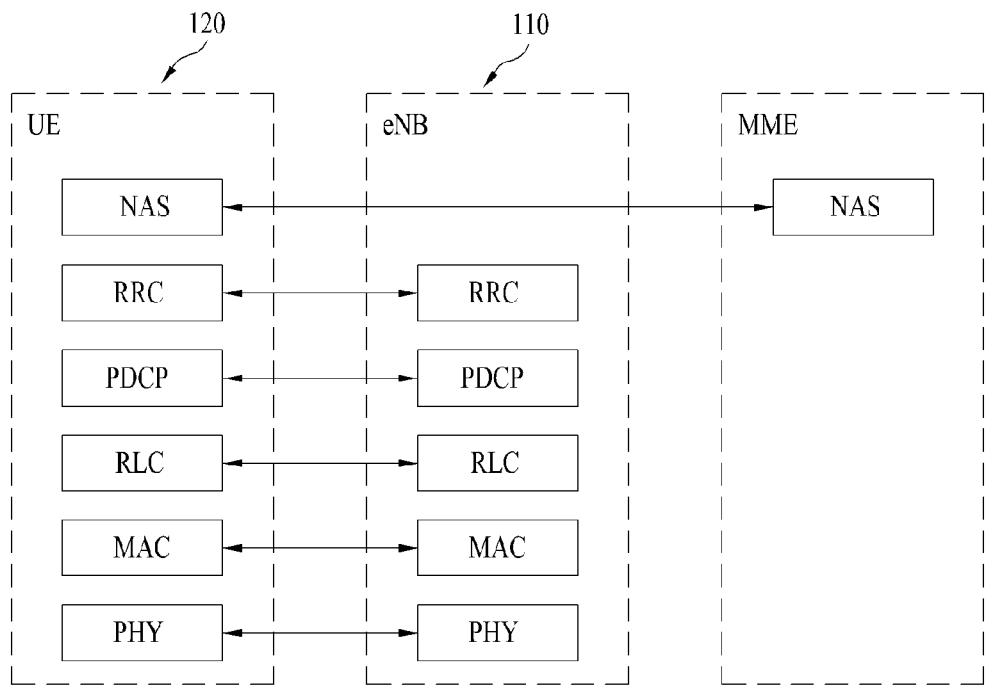
(a) CONTROL-PLANE PROTOCOL STACK
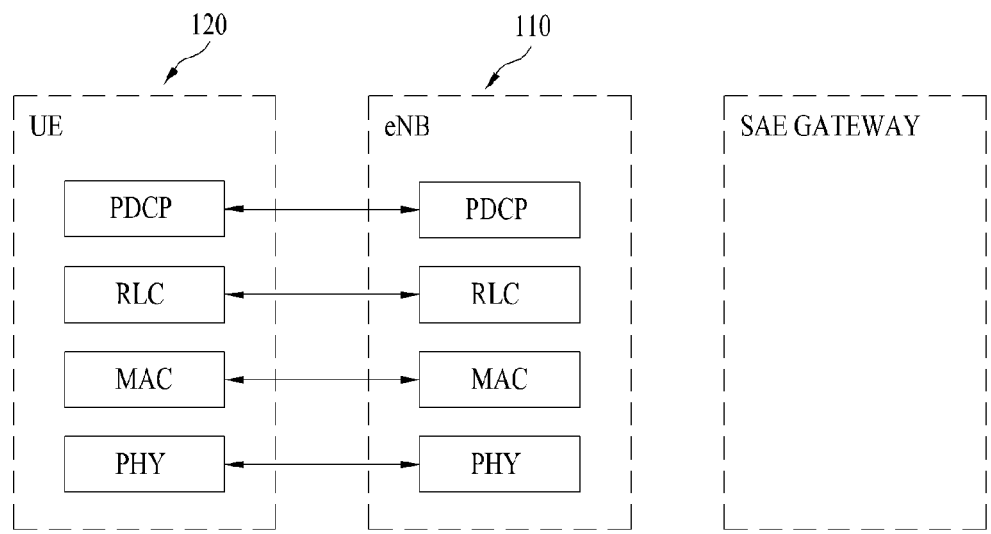
(b) USER-PLANE PROTOCOL STACK FIG. 7
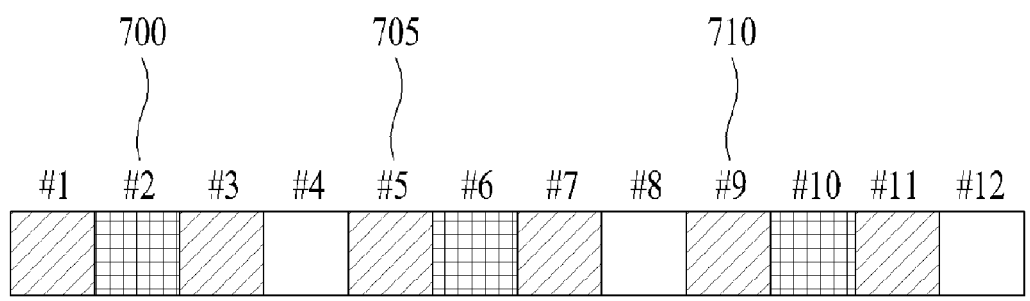
 PERIODIC SRS
 ADDITIONAL SRS

METHOD AND APPARATUS FOR TRANSMITTING SOUNDING REFERENCE SIGNAL IN RADIO COMMUNICATION SYSTEM

CROSS REFERENCE TO RELATED APPLICATIONS

This application is the National Phase of PCT/KR2010/003104 filed on May 17, 2010, which claims the benefit under 35 U.S.C. 119(e) of U.S. Provisional Application Nos. 61/178,818 and 61/305,080 filed on May 15, 2009 and Feb. 16, 2010, respectively, and claims priority under 35 U.S.C. 119 (a) to Patent Application No. 10-2010-0045447 filed in Republic of Korea on May 14, 2010, all of which are hereby expressly incorporated by reference into the present application.

TECHNICAL FIELD

The present invention relates to a radio communication system, and more particularly, to a method and apparatus for transmitting sounding reference signals from a user equipment to a base station in a radio communication system.

BACKGROUND ART

As an example of a mobile communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE) 120, base stations (or eNBs or eNode Bs) 110a and 110b, and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although radio communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

Recently, the standardization of the subsequent technology of the LTE is ongoing in the 3GPP. In the present specification, the above-described technology is called "LTE-Advanced" or "LTE-A". The LTE system and the LTE-A system are different from each other in terms of system bandwidth. The LTE-A system aims to support a wideband of a maximum of 100 MHz. The LTE-A system uses carrier aggregation or bandwidth aggregation technology which achieves the wideband using a plurality of frequency blocks. The carrier aggregation enables the plurality of frequency blocks to be used as one large logical frequency band in order to use a wider frequency band. The bandwidth of each of the frequency blocks may be defined based on the bandwidth of a system block used in the LTE system. Each frequency block is transmitted using a component carrier.

DISCLOSURE

Technical Problem

An object of the present invention is to provide a method and apparatus for transmitting sounding reference signals from a user equipment to a base station in a radio communication system.

The technical problems solved by the present invention are not limited to the above technical problems and those skilled in the art may understand other technical problems from the following description.

Technical Solution

The object of the present invention can be achieved by providing a method for transmitting sounding reference signals by a user equipment in a radio communication system, including transmitting a periodic sounding reference signal to a base station, receiving an instruction to transmit an additional sounding reference signal from the base station, multiplexing the periodic sounding reference signal and the additional sounding reference signal on a frequency axis or a time axis, and transmitting the multiplexed periodic sounding reference signal and additional sounding reference signal to the base station. The additional sounding reference signal may be transmitted to the base station via a last symbol of a subframe.

The multiplexing may include differently setting a transmissionComb parameter of the periodic sounding reference signal and a transmissionComb parameter of the additional sounding reference signal.

The multiplexing may include applying a predetermined subframe offset value from a subframe, in which the periodic sounding reference signal is transmitted, to a subframe, in which the additional sounding reference signal is transmitted. The method may further include receiving the predetermined subframe offset value from the base station. The predetermined subframe offset value may be less than a transmission periodicity of the periodic sounding reference signal.

In another aspect of the present invention, there is provided a method for transmitting sounding reference signals by a user equipment in a radio communication system, including transmitting a periodic sounding reference signal to a base station, receiving an instruction to transmit an additional sounding reference signal from the base station, and dropping one of the periodic sounding reference signal and the additional sounding reference signal if the periodic sounding reference signal and the additional sounding reference signal are transmitted via the same symbol.

In another aspect of the present invention, there is provided a user equipment apparatus in a radio communication system, including a transmission module configured to transmit a periodic sounding reference signal and an additional sounding reference signal to a base station, a reception module configured to receive an instruction to transmit the additional sounding reference signal from the base station, and a processor configured to multiplex the periodic sounding reference signal and the additional sounding reference signal on a frequency axis or a time axis. The processor may allocate a last symbol of a subframe as time resources for transmitting the additional sounding reference signal.

The processor may differently set a transmissionComb parameter of the periodic sounding reference signal and a transmissionComb parameter of the additional sounding reference signal.

The processor may apply a predetermined subframe offset value from a subframe, in which the periodic sounding reference signal is transmitted, to a subframe, in which the additional sounding reference signal is transmitted. The reception module may receive the predetermined subframe offset value from the base station. The predetermined subframe offset value may be less than a transmission periodicity of the periodic sounding reference signal.

In another aspect of the present invention, there is provided a user equipment apparatus in a radio communication system, including a transmission module configured to transmit a periodic sounding reference signal and an additional sounding reference signal to a base station, a reception module configured to receive an instruction to transmit the additional sounding reference signal from the base station, and a processor configured to drop one of the periodic sounding reference signal and the additional sounding reference signal if the same symbol is allocated to the periodic sounding reference signal and the additional sounding reference signal.

Advantageous Effects

According to the embodiments of the present invention, it is possible to efficiently transmit sounding reference signals in a radio communication system.

The effects of the present invention are not limited to the above-described effects and other effects which are not described herein will become apparent to those skilled in the art from the following description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

FIG. 7 is a diagram showing a method of multiplexing a periodic sounding reference signal and an additional sounding reference signal according to another embodiment of the present invention.

BEST MODE

Figure 1:
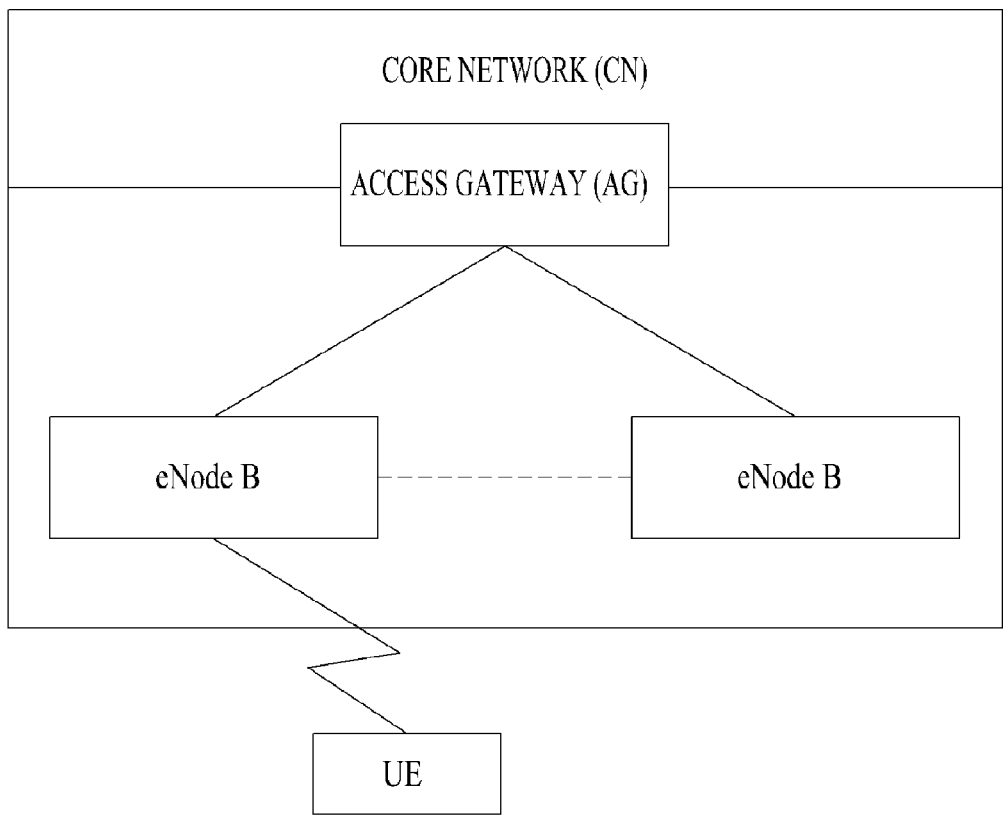
FIG. 1 is a diagram showing a network structure of an Evolved Universal Mobile Telecommunications System (E-UMTS) as an example of a mobile communication system.

The configuration, operation and other features of the present invention will be understood by the embodiments of the present invention described with reference to the accompanying drawings. The following embodiments are examples of applying the technical features of the present invention to a $3^{rd}$ Partnership Project (3GPP) system.

Hereinafter, a system in which a system band uses a single frequency block is referred to as a legacy system or a narrowband system. A system in which a system band includes a plurality of frequency blocks and at least one frequency blocks are used as a system block of a legacy system is referred to as an evolved system or a wideband system. The frequency block used as the legacy system block has the same size as the system block and the legacy system. The sizes of the remaining frequency blocks are not specially limited. However, in order to simplify a system, the size of the remaining frequency blocks may be determined based on the size of the system block of the legacy system. For example, a 3GPP LTE system and a 3GPP LTE-A system are evolved from a legacy system.

Based on the above definition, in the present specification, a 3GPP LTE system is called an LTE system or a legacy system. A user equipment (UE) which supports an LTE system is called an LTE UE or a legacy UE. A 3GPP LTE-A system is called an LTE-A system or an evolved system. A UE which supports an LTE-A system is called an LTE-A UE or an evolved UE.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
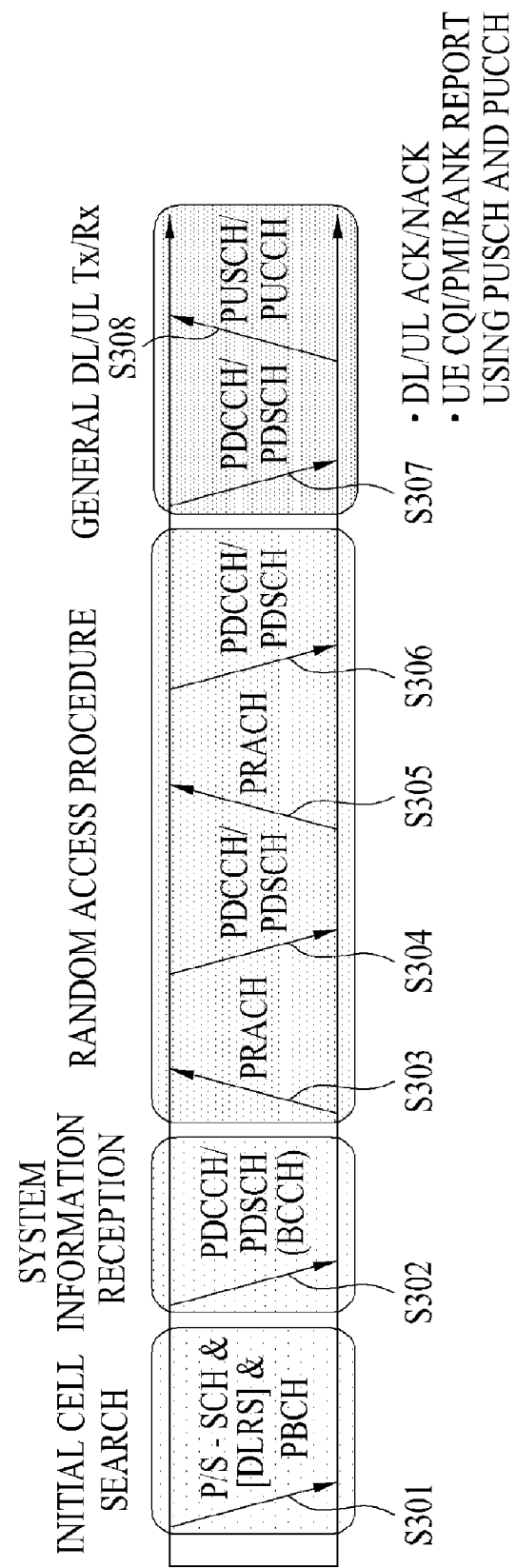
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
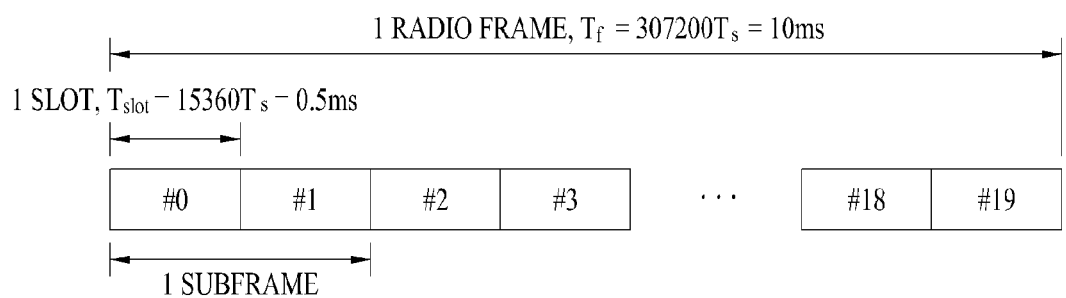
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \cdot T_s$) and includes 10 subframes with the same size. Each of the subframes has a length of 1 ms and includes two slots. Each of the slots has a length of 0.5 ms ($15360 \cdot T_s$). $T_s$ denotes a sampling time, and is represented by $T_s=1/(15 \text{ kHz} \times 2048)=3.2552 \times 10^{-8}$ (about 33 ns). Each slot includes a plurality of OFDM or SC-FDMA symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
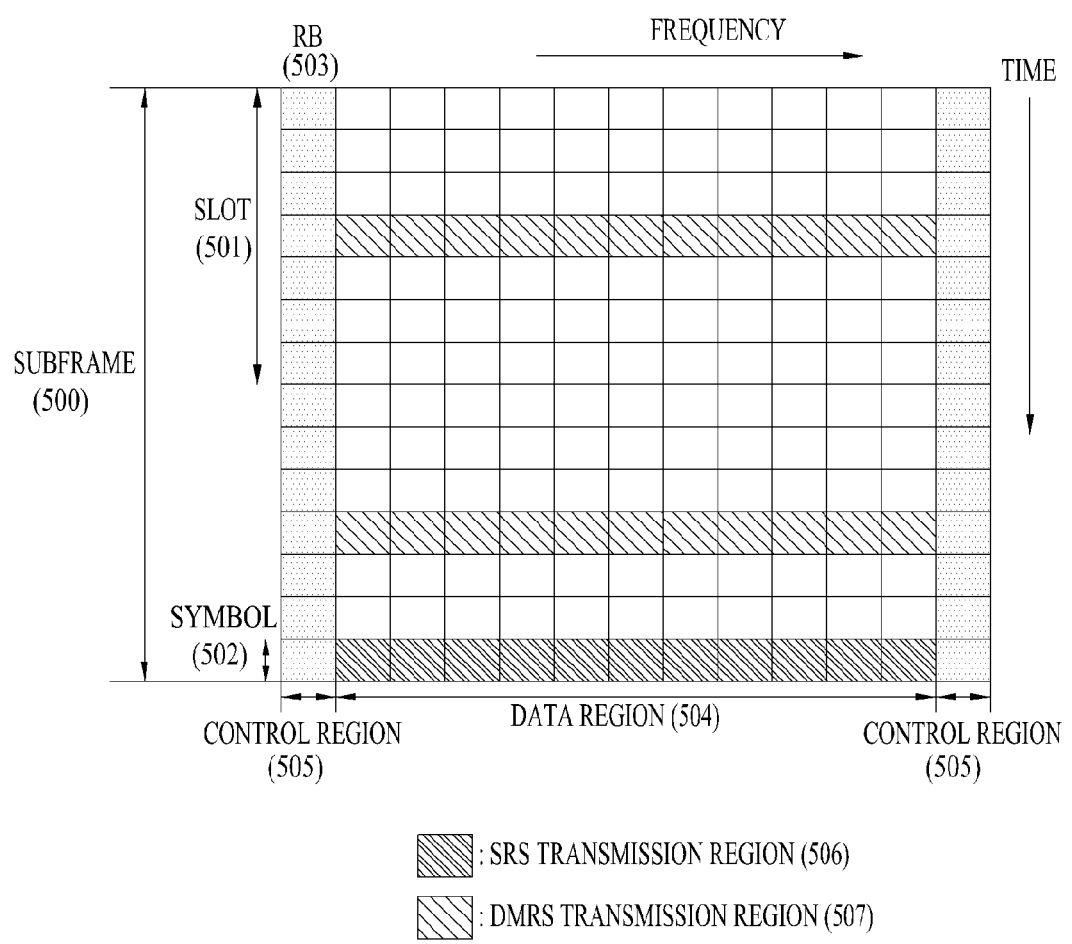
FIG. 5 is a diagram showing the structure of an uplink subframe in an LTE system.

FIG. 5 is a diagram showing the structure of an uplink subframe in an LTE system.

Referring to FIG. 5, a subframe 500 having a length of 1 ms, which is a basic unit of LTE uplink transmission, includes two slots 501 each having a length of 0.5 ms. In case of normal cyclic prefix (CP), each slot includes seven symbols 502 and one symbol corresponds to one SC-FDMA symbol. An RB 503 is a resource allocation unit corresponding to 12 subcarriers in a frequency domain and one slot in a time domain. The structure of the uplink subframe of the LTE is roughly divided into a data region 504 and a control region 505. The data region refers to a series of communication resources used to transmit data such as voice or packets to each UE and corresponds to resources excluding resources belonging to the control region in a subframe. The control region refers to a series of communication resources used to transmit a downlink channel quality report from each UE, reception ACK/NACK for a downlink signal, an uplink scheduling request, etc.

As shown in FIG. 5, a region 506 for transmitting a sounding reference signal (SRS) within one subframe is a part including SC-FDMA symbols located at the very last of a time axis and the SRS is transmitted via a data transmission band on a frequency axis. SRSs of several UEs transmitted using the last SC-FDMA symbols of the same subframe may be distinguished according to frequency locations.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values $\alpha$ according to Equation 1.

$$\alpha = 2\pi \frac{n_{SRS}^{cs}}{8} \qquad \text{Equation 1}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will he described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 2.

$$a_{2k+k_0,l} = \begin{cases} \beta_{SRS} r^{SRS}(k) & k=0,1,\ldots,M_{sc,b}^{RS}-1 \\ 0 & \text{otherwise} \end{cases} \qquad \text{Equation 2}$$

where, $k_0$ denotes a frequency domain start point of an SRS and is defined by Equation 3.

$$k_0 = k_0' + \sum_{b=0}^{B_{SRS}} 2M_{sc,b}^{RS} n_b \qquad \text{Equation 3}$$

where, $n_b$ denotes a frequency location index. $k_0'$ for a general uplink subframe is defined by Equation 4 and $k_0'$ for an uplink pilot time is defined by Equation 5.

$$k_0' = (\lfloor N_{RB}^{UL}/2 \rfloor - m_{SRS,0}/2)N_{sc}^{RB} + k_{TC} \qquad \text{Equation 4}$$

$$k_0' = \begin{cases} (N_{RB}^{UL} - m_{SRS,0}^{max})N_{sc}^{RB} + k_{TC} & \text{if } \begin{pmatrix} (n_f \bmod 2) \times \\ (2-N_{SP})+n_{hf} \end{pmatrix} \bmod 2 = 0 \\ k_{TC} & \text{otherwise} \end{cases} \qquad \text{Equation 5}$$

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 6.

$$M_{sc,b}^{RS} = m_{SRS,b} N_{sc}^{RB}/2 \qquad \text{Equation 6}$$

In Equation 6, $m_{SRS,b}$ is a value signaled from an eNB according to an uplink bandwidth $N_{RB}^{UL}$ as shown in Tables 1 to 4.

In order to acquire $m_{SRS,b}$, a cell-specific parameter $C_{SRS}$ having an integer value of 0 to 7 and a UE-specific parameter $B_{SRS}$ having an integer value of 0 to 3 are necessary. The values of $C_{SRS}$ and $B_{SRS}$ are provided by a higher layer.

TABLE 1

$b_{hop} = 0, 1, 2, 3$ and $6 \leq N_{RB}^{UL} \leq 40$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop} = 0, 1, 2, 3$ and $40 < N_{RB}^{UL} \leq 60$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop} = 0, 1, 2, 3$ and $60 < N_{RB}^{UL} \leq 80$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop} = 0, 1, 2, 3$ and $80 < N_{RB}^{UL} \leq 110$

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As described above, the UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 7. Here, $n_{RRC}$ is a parameter received from a higher layer.

$$n_b = \lfloor 4n_{RRC}/m_{SRS,b} \rfloor \bmod N_b \quad \text{Equation 7}$$

Meanwhile, if frequency hopping of the SRS is activated, that is, $b_{hop} < B_{SRS}$, a frequency location index $n_b$ is defined by Equations 8 and 9.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{Equation 8}$$

$$F_b(n_{SRS}) = \begin{cases} (N_b/2) \left\lfloor \frac{n_{SRS} \bmod \prod_{b'=b_{hop}}^{b} N_{b'}'}{\prod_{b'=b_{hop}}^{b-1} N_{b'}} \right\rfloor + \left\lfloor \frac{n_{SRS} \bmod \prod_{b'=b_{hop}}^{b} N_{b'}'}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad \text{Equation 9}$$

where, $n_{SRS}$ is a parameter used to calculate the number of times of transmitting the SRS and is defined by Equation 10.

$$n_{SRS} = \begin{cases} 2N_{SP}n_f + 2(N_{SP}-1)\left\lfloor \frac{n_s}{10} \right\rfloor + \left\lfloor \frac{T_{offset}}{T_{offset\_max}} \right\rfloor, & \text{for 2 ms SRS periodicity of TDD frame structure} \\ \lfloor (n_f \times 10 + \lfloor n_s/2 \rfloor)/T_{SRS} \rfloor, & \text{otherwise} \end{cases} \quad \text{Equation 10}$$

In Equation 10, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Tables 5 and 6 according to FDD and TDD. In particular, Table 5 shows the SRS configuration index for FDD and Table 6 shows the SRS configuration index for TDD.

TABLE 5

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}-2$ |
| 7-16 | 10 | $I_{SRS}-7$ |
| 17-36 | 20 | $I_{SRS}-17$ |
| 37-76 | 40 | $I_{SRS}-37$ |
| 77-156 | 80 | $I_{SRS}-77$ |
| 157-316 | 160 | $I_{SRS}-157$ |
| 317-636 | 320 | $I_{SRS}-317$ |
| 637-1023 | reserved | reserved |

TABLE 6

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}-10$ |
| 15-24 | 10 | $I_{SRS}-15$ |
| 25-44 | 20 | $I_{SRS}-25$ |
| 45-84 | 40 | $I_{SRS}-45$ |
| 85-164 | 80 | $I_{SRS}-85$ |
| 165-324 | 160 | $I_{SRS}-165$ |
| 325-644 | 320 | $I_{SRS}-325$ |
| 645-1023 | reserved | reserved |

The above-described SRS of the existing LTE system refers to a periodic SRS. Meanwhile, in an LTE-A system, an additional SRS which is conditionally generated when an event occurs may be defined. That is, if an eNB requests to transmit an SRS for uplink MIMO transmission or requests uplink channel state information for another reason, an additional SRS defined in the LTE-A system needs to be transmitted separately from the periodic SRS.

Meanwhile, for transmission of the additional SRS, reuse of resources for transmitting the existing SRS may be considered. In this case, since the periodic SRS and the additional SRS may be simultaneously allocated via last symbols of one subframe, a method of efficiently multiplexing SRSs is required. Hereinafter, the method of multiplexing the periodic SRS and the additional SRS will be described in detail.

1) As a first method of multiplexing the periodic SRS and the additional SRS, a method of multiplexing the SRSs using different repetition factors is proposed. More specifically, the periodic SRS defined in the LTE system uses a repetition factor of 2. That is, if a transmissionComb parameter is 0, the periodic SRS is transmitted via a subcarrier having an odd index (or an even index) with a corresponding UE-specific sounding bandwidth and, if a transmissionComb parameter is 1, the periodic SRS is transmitted via a subcarrier having an even index (or an odd index).

In this case, if the periodic SRS and the additional SRS should be simultaneously transmitted via one symbol, different transmissionComb parameters may be set to these signals and these signals may be simultaneously transmitted.

Figure 6:
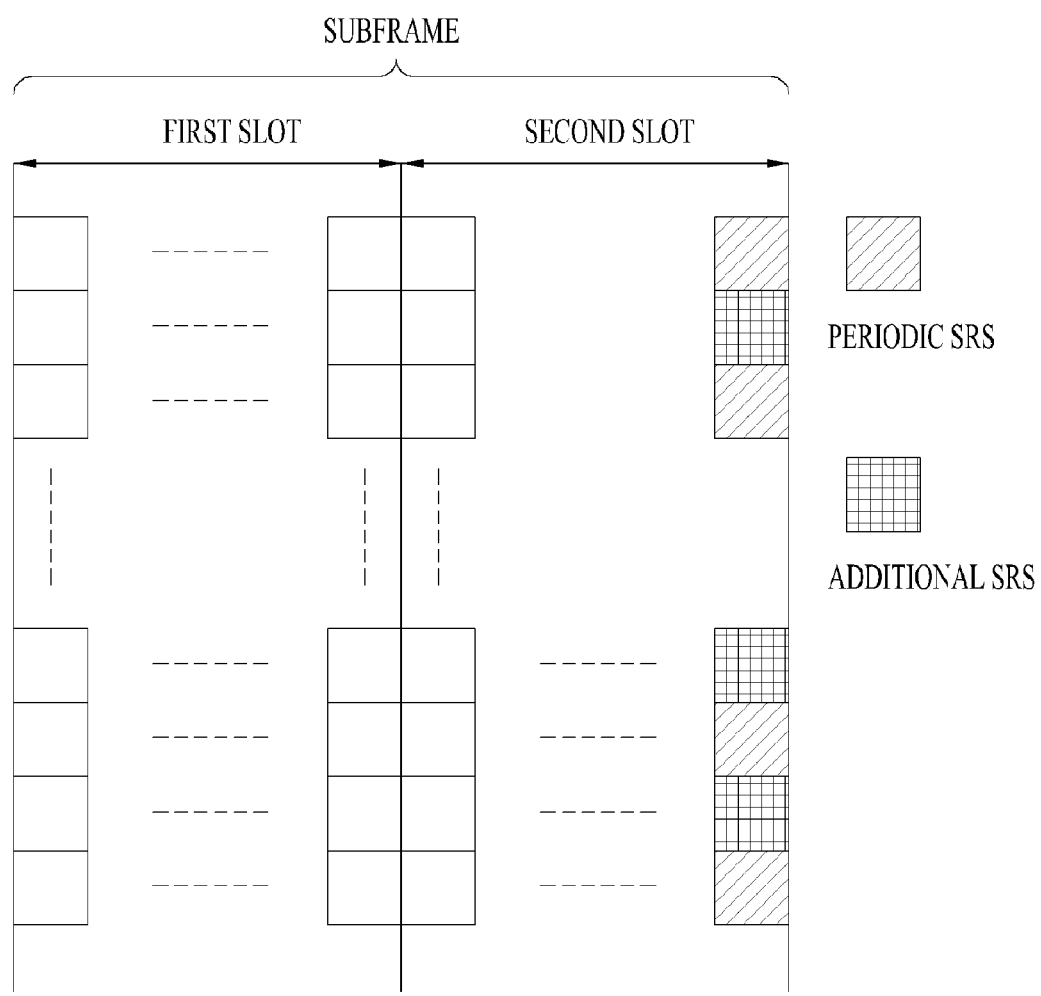
FIG. 6 is a diagram showing a method of multiplexing a periodic sounding reference signal and an additional sounding reference signal according to an embodiment of the present invention.

FIG. 6 is a diagram showing a method of multiplexing a periodic SRS and an additional SRS according to an embodiment of the present invention. In FIG. 6, for convenience of description, the bandwidth of the periodic SRS and the bandwidth of the additional SRS are half the entire sounding bandwidth.

It can be seen from FIG. 6 that a transmissionComb parameter of 0 is set to the periodic SRS such that the periodic SRS is transmitted via a subcarrier having an odd index with a corresponding UE-specific sounding bandwidth and a transmissionComb parameter of 1 is set to the additional SRS such that the additional SRS is transmitted via a subcarrier having an even index.

2) As a second method of multiplexing the periodic SRS and the additional SRS, a method of setting a subframe, in which the additional SRS is transmitted, using an offset value from a subframe, in which the periodic SRS is transmitted, and multiplexing the periodic SRS and the additional SRS such that the periodic SRS and the additional SRS are transmitted via different time resources may be considered. That is, a method of allocating resources to the periodic SRS and the additional SRS in a time division multiplexing method and transmitting the periodic SRS and the additional SRS may be used. Such a subframe offset value may be semi-statically signaled via an RRC layer or dynamically indicated via L1/L2 control signaling.

More specifically, except for the case where the periodicity of the periodic SRS is 1 ms, a subframe offset value is applied to a transmission time of one of the periodic SRS or the additional SRS to delay transmission. For example, if the periodicity of the periodic SRS is 2 ms (or 2 subframes), the subframe offset value may be set to 1 ms (or one subframe). If the periodicity of the periodic SRS is 5 ms (or 5 subframes), the subframe offset value may be set to one of 1, 2, 3 or 4 ms (or 1, 2, 3 or 4 subframes). Similarly, if the periodicity of the periodic SRS is 10 ms (or 10 subframes), the subframe offset value may be set to one of 1, 2, 3, 4, . . . , and 9 ms (1, 2, 3, 4, . . . , and 9 subframes).

FIG. 7 is a diagram showing a method of multiplexing a periodic SRS and an additional SRS according to another embodiment of the present invention.

Referring to FIG. 7, it is assumed that, while the periodic SRS, a periodicity of which is 2 subframes, is transmitted, an eNB instructs a UE to transmit the additional SRS to the eNB in a subframe index 2 700, a subframe index 5 705 and a subframe index 9 710. In this case, in another embodiment of the present invention, the subframe offset value may be set to one subframe and the SRSs may be transmitted using a time division multiplexing method. That is, in the subframe index 2 700, since resources for the periodic SRS are not allocated, a separate subframe offset for the additional SRS is unnecessary. However, in the subframe index 5 705 and the subframe index 9 710, the subframe offset value may be set to one subframe and the additional SRS may be transmitted in the subframe index 6 and the subframe index 10.

3) Finally, if the periodic SRS and the additional SRS are configured to be transmitted via the same symbol, in order to maintain a single carrier property, a method of dropping one of the two SRS in a symbol of a subframe may be considered.

More specifically, the additional SRS may be transmitted once or may be transmitted via a plurality of antennas in order to support uplink MIMO transmission. Accordingly, in this case, since the priority of the additional SRS is higher than that of the periodic SRS, the periodic SRS is dropped in the subframe.

However, if the periodic SRS is a sounding signal of an entire bandwidth, the periodic SRS is preferably transmitted and the additional SRS is dropped. In this case, a scheduler may dynamically signal information indicating whether or not the additional SRS is transmitted. Accordingly, in terms of the operation of the UE, if the additional aperiodic SRS and the periodic SRS are simultaneously configured in the same symbol as one subframe, an operation for dropping the aperiodic SRS is applicable to the UE.

Figure 8:
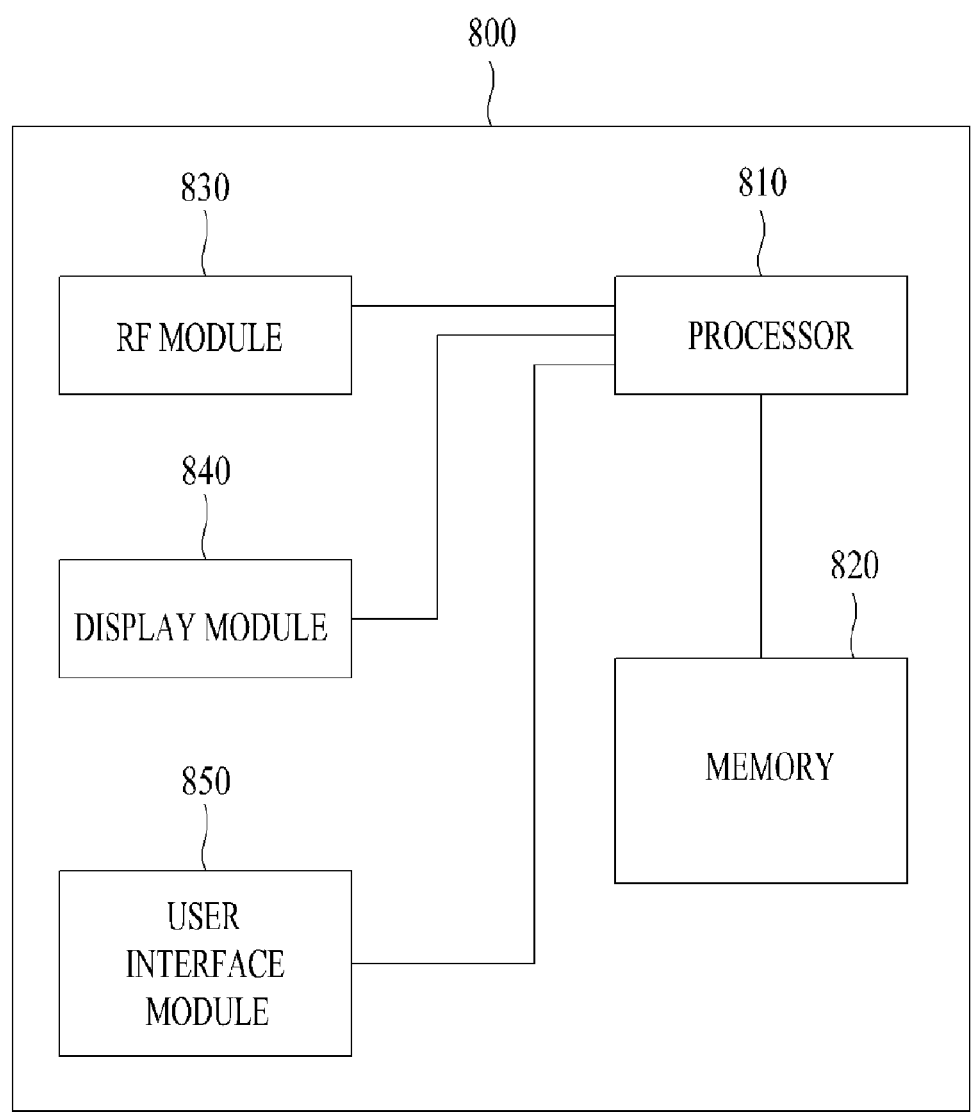
FIG. 8 is a block diagram showing a transmitter or receiver according to an embodiment of the present invention.

FIG. 8 is a block diagram showing a transmitter or receiver according to an embodiment of the present invention. The transmitter or receiver may be a part of an eNB or a UE.

Referring to FIG. 8, a transmitter/receiver 800 includes a processor 810, a memory 820, a Radio Frequency (RF) module 830, a display module 840 and a user interface module 850.

The transmitter/receiver 800 is shown for convenience of description and some modules thereof may be omitted. In addition, the transmitter/receiver 800 may further include necessary modules. In addition, some modules of the transmitter/receiver 800 may be subdivided. The processor 810 is configured to perform an operation of the embodiment of the present invention described with respect to the drawings.

More specifically, if the transmitter/receiver 800 is a portion of an eNB, the processor 810 may perform a function for generating a control signal and mapping the control signal to a control channel set within a plurality of frequency blocks. If the transmitter/receiver 800 is a portion of a UE, the processor 810 may confirm a control channel indicated thereto from a signal received through a plurality of frequency blocks and extract a control signal.

Thereafter, the processor 810 may perform a necessary operation based on the control signal. For a detailed description of the operation of the processor 810, reference may be made to the description associated with FIGS. 1 to 7.

The memory 820 is connected to the processor 810 so as to store an operating system, an application, program code, data and the like. The RF module 830 is connected to the processor 810 so as to perform a function for converting a baseband signal into a radio signal or converting a radio signal into a baseband signal. The RF module 830 performs analog conversion, amplification, filtering and frequency up-conversion or inverse processes thereof. The display module 840 is connected to the processor 810 so as to display a variety of information. As the display module 840, although not limited thereto, a known device such as a Liquid Crystal Display (LCD), a Light Emitting Diode (LED), or an Organic Light Emitting Diode (OLED) may be used. The user interface module 850 is connected to the processor 810 and may be configured by a combination of known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "User Equipment (UE)" may also be replaced with the term subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a radio communication system and, more particularly, to a method and apparatus for transmitting sounding reference signals in a radio communication system to which carrier aggregation is applied.

The invention claimed is:

1. A method for transmitting a sounding reference signal (SRS) at a user equipment in a wireless communication system, the method comprising:
   configuring at least one parameter for the SRS by a higher layer; and
   transmitting at least one of a first SRS triggered by the higher layer and a second SRS triggered by a downlink control information (DCI) to a base station, based on the at least one parameter, wherein, if both transmission of the first SRS and transmission of the second SRS are occurred in a same subframe, the second SRS is only transmitted to the base station.

2. The method according to claim 1, wherein both the first SRS and the second SRS are transmitted on a last symbol of a subframe.

3. The method according to claim 1, wherein the DCI is received through a PDCCH (Physical Downlink Control CHannel) from the base station.

4. The method according to claim 1, wherein the first SRS is transmitted periodically to the base station.

5. The method according to claim 1, wherein the second SRS is transmitted aperiodically to the base station.

6. A user equipment in a wireless communication system, the user equipment comprising:
   a processor for configuring at least one parameter for a sounding reference signal (SRS) by a higher layer signaling, and
   a transmitting module for transmitting at least one of a first SRS triggered by the higher layer signaling and a second SRS triggered by a downlink control information (DCI) to a base station, based on the at least one parameter,
   wherein, if both transmission of the first SRS and transmission of the second SRS are occurred in a same subframe, the second SRS is only transmitted to the base station.

7. The user equipment according to claim 6, wherein both the first SRS and the second SRS are transmitted on a last symbol of a subframe.

8. The user equipment according to claim 6, further comprising a receiving module for receiving the DCI through a PDCCH (Physical Downlink Control CHannel) from the base station.

9. The user equipment according to claim 6, wherein the first SRS is transmitted periodically to the base station.

10. The user equipment according to claim 6, wherein the second SRS is transmitted aperiodically to the base station.

* * * * *